United States Patent [19]

Rastogi et al.

[11] Patent Number: 5,658,526
[45] Date of Patent: Aug. 19, 1997

[54] METHOD TO PREPARE BLOWN FILMS OF VINYL AROMATIC/CONJUGATED DIOLEFIN BLOCK COPOLYMER

[75] Inventors: Amit Rastogi, Bombay, India; Bing Yang, Houston, Tex.

[73] Assignee: Shell Oil Company, Houston, Tex.

[21] Appl. No.: 551,599

[22] Filed: Nov. 1, 1995

[51] Int. Cl.$^6$ .................................................. B29C 55/28
[52] U.S. Cl. ..................... 264/564; 264/569; 425/326.1; 425/467
[58] Field of Search .......................... 264/564, 569, 264/566, 565; 425/326.1, 467

[56] References Cited

U.S. PATENT DOCUMENTS

| | | | |
|---|---|---|---|
| Re. 27,145 | 6/1971 | Jones | 260/880 |
| 2,461,975 | 2/1949 | Fuller | 18/57 |
| 2,461,976 | 2/1949 | Schenk | 18/57 |
| 2,632,206 | 3/1953 | Pierce | 18/14 |
| 2,844,846 | 7/1958 | Kronholm | 18/14 |
| 3,179,978 | 4/1965 | Bergevin | 18/14 |
| 3,251,905 | 5/1966 | Zelinski | 260/879 |
| 3,252,905 | 5/1966 | Schaeffer | 252/12 |
| 3,265,765 | 8/1966 | Holden et al. | 260/876 |
| 3,321,635 | 5/1967 | Jacobs | 250/218 |
| 3,322,856 | 5/1967 | Holden et al. | 260/876 |
| 3,388,426 | 6/1968 | Schott, Jr. | 18/14 |
| 3,390,207 | 6/1968 | Moss et al. | 260/879 |
| 3,494,942 | 2/1970 | Miki et al. | 260/397.5 |
| 3,598,888 | 8/1971 | Tada et al. | 13/33 |
| 3,629,387 | 12/1971 | Watanabe et al. | 264/564 |
| 3,634,549 | 1/1972 | Shaw et al. | 260/880 B |
| 3,639,521 | 2/1972 | Hsieh | 260/880 |
| 3,670,054 | 6/1972 | De La Mare et al. | 260/880 B |
| 3,700,633 | 10/1972 | Wald et al. | 260/880 B |
| 3,724,976 | 4/1973 | Rode | 425/467 |
| 3,835,209 | 9/1974 | Karabedian | 264/569 |
| 3,888,609 | 6/1975 | Saint Eve et al. | 425/72 |
| 3,947,536 | 3/1976 | Horiie et al. | 264/564 |
| 3,976,732 | 8/1976 | Herrington | 264/89 |
| 4,022,558 | 5/1977 | Herrington | 425/72 R |
| 4,033,888 | 7/1977 | Kiovsky | 252/56 D |
| 4,077,893 | 3/1978 | Kiovsky | 252/56 R |
| 4,141,847 | 2/1979 | Kiovsky | 252/51.5 A |
| 4,208,356 | 6/1980 | Fukawa et al. | 525/89 |
| 4,219,627 | 8/1980 | Halasa et al. | 525/89 |
| 4,391,949 | 7/1983 | St. Clair | 525/99 |
| 4,444,953 | 4/1984 | St. Clair | 525/98 |
| 5,068,138 | 11/1991 | Mitchell et al. | 264/564 |
| 5,322,664 | 6/1994 | Blackwelder | 264/565 |

FOREIGN PATENT DOCUMENTS

| | | | |
|---|---|---|---|
| 973668 | 9/1975 | Canada | 264/566 |
| 2728348 | 12/1977 | Germany | 264/564 |
| 51-71363 | 6/1976 | Japan | 264/564 |
| 1110003 | 4/1968 | United Kingdom . | |

*Primary Examiner*—Jeffery R. Thurlow
*Attorney, Agent, or Firm*—Del S. Christensen

[57] ABSTRACT

A method is provided to produce a blown film of a vinyl aromatic/conjugated block copolymer, the method including the steps of:

provided an elastomeric composition, the composition comprising a block copolymer of vinyl aromatic and a conjugated block copolymer;

melting the composition in an extruder;

passing the melted composition from the extruder through a die, the die being a circular die comprising a circular outlet and a tapered channel leading to the circular outlet, the circular outlet having an opening width of about $10^{-2}$ inches, the taper being a linear taper of at least a one inch length, the center of the linear taper being angled away from the center of the circular outlet at an angle of at least 10° from a line normal to the circular outlet, and the die having a source of gas pressure inside of the circular outlet; and cooling the extruded composition that has been passed through the die with a cooling gas stream.

5 Claims, 2 Drawing Sheets

METHOD TO PREPARE BLOWN FILMS OF VINYL AROMATIC/CONJUGATED DIOLEFIN BLOCK COPOLYMER

FIELD OF INVENTION

This invention relates to a method to prepare blown films of elastomeric vinyl aromatic/conjugated diolefin block copolymers.

BACKGROUND OF THE INVENTION

Block copolymers of styrene and conjugated diolefins have long been known as useful as elastomeric thermoplastics. These block copolymers are referred to as thermoplastic polymers because they may be worked by heating the polymer to above the polymer's melting temperature, and then processing by such methods as vacuum forming, extrusion, compression molding, calendaring or blow molding. These block copolymers have good tear resistance, flexibility, thermochemical stability and other properties.

The thermoplastic properties of block copolymers of styrene and conjugated diolefins are the result of incompatibility between the polystyrene and the polydiolefin polymeric blocks which causes separate polymeric phases to exist. At service temperatures, the polydiolefin domains are rubbery and elastic, whereas the polystyrene domains are hard and glassy. The polystyrene domains serve as physical crosslinks between the rubbery polydiolefin blocks. This causes the polymer to behave much like a vulcanized rubber at temperatures that are below the polystyrene glass transition temperature. By heating the block copolymer to a temperature higher than the glass transition temperature of the polystyrene domains, the polymer may be processed as a melt and formed into useful shapes.

Blown films of about 1 mil thick have not been commercially made from block copolymers of styrene and conjugated diolefins because blown films using typical blown film extruders and dies have resulted in films of about two mils thickness or greater. Films of this thickness can be prepared by other processes that are simpler than blown film technology. It would be desirable to have thinner blown films for many different uses, such as elastic gloves and baby diaper waist bands. Blown films of other materials can be made of one mil thickness or less, but the elastomeric copolymers of block copolymers of styrene and conjugated diolefins have properties that make blown film extrusion very difficult. Previous attempts to blow-extrude films of these copolymers to thicknesses of about one mil have been unsuccessful.

It is therefore an objective of the present invention to provide a method to prepare blown films of block copolymers of vinyl aromatics conjugated diolefins wherein the blown films have a thickness of less than about one mil. It is further object to provide such a method wherein commercially available blown film extruders can be used without significant modifications.

SUMMARY OF INVENTION

The objectives of the present invention are accomplished by a method to produce a blown film of a vinyl aromatic/conjugated block copolymer, the method comprising the steps of:

providing an elastomeric composition, the composition comprising a block copolymer of vinyl aromatic and a conjugated block copolymer;

melting the composition in an extruder;

passing the melted composition from the extruder through a die, the die being a circular die comprising a circular outlet and a tapered channel leading to the circular outlet, the circular outlet having a opening width of about $10^{-2}$ inches, the taper being a linear taper of at least a one inch length, the center of the linear taper being angled away from the center of the circular outlet at an angle of at least 10° from a line normal to the circular outlet, and the die having a source of gas pressure inside of the circular outlet; and cooling the extruded composition that has been passed through the die with a cooling gas stream.

The elastomeric film made according to the present invention can be made with a thickness of between about one and about two mils, which is desirable for many applications of elastomeric film. Previously, extruded films could be made only to thickness greater than about two mils, and blown extruded films could not be made less than about two mils thickness because of the lack of an appropriate die. With the die of the present invention, films of between one and two mils thickness can be prepared with excellent consistency and reliability.

DETAILED DESCRIPTION OF THE INVENTION

Figure 1A:
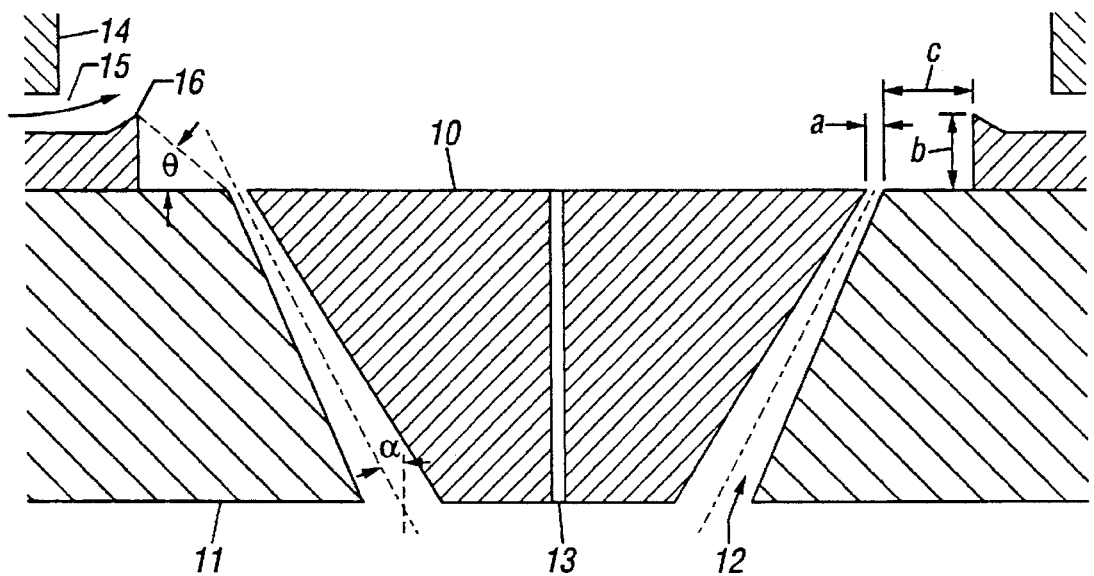
FIG. 1A is a cross sectional view of a die useful in the practice of the present invention.

The block copolymer of the present invention may be linear, branched, coupled or radial because the invention does not depend on any specific geometrical structure, but rather on the chemical constituents of each of the polymer blocks. The radial, or star, block copolymer may be symmetric or asymmetric. The polymer may also be a grafted block copolymer. The only requirement being that the blocks phase separate into aromatic and aliphatic domains and that at least a portion of the aliphatic blocks be surrounded by at least one aromatic block on each end of the aliphatic block.

The block copolymer may be produced by any block polymerization procedure including sequential addition of monomer techniques, incremental addition of monomer techniques, or various coupling techniques. Tapered copolymer techniques may also be used.

Useful linear block copolymers include linear block copolymers such as those described in U.S. Pat. Nos. 3,321,635 ; 3,265,765 and 3,322,856, which are incorporated herein by reference. In general, linear and branched block copolymers include those that may be represented by the general formula:

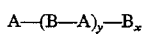

wherein:

A is a linear or branched polymeric block comprising predominantly vinyl aromatic hydrocarbon monomer units (referred to as Block A);

B is a linear or branched polymeric block containing predominately conjugated diolefin monomer units (referred to as Block B);

x is equal to 0 or 1; and y is a whole number ranging from 1 to about 20.

Radial block copolymers include polymers of the type described in U.S. Pat. Nos. 4,033,888; 4,077,893; 4,141, 847; 4,391,949 and 4,444,953, which are also incorporated herein by reference. Coupled and radial block copolymers include those that may be represented by the general formula:

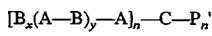

wherein:

A, B, x, and y are as previously defined;

n and n' are, independently, numbers from 1 to about 40 such that n+n'is greater than or equal to 3;

C is the core of the coupled or radial polymer formed with a polyfunctional coupling agent having two or more functional groups; and each P is the same or a different polymer block or polymer segment having the general formula:

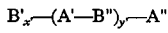

wherein:

A" is a polymer block containing predominantly vinyl aromatic hydrocarbon monomer units which may be the same or different from A;

B' is a polymer block containing predominantly conjugated diolefin monomer units which may be the same or different from B;

A'—B" is a polymer block containing vinyl aromatic hydrocarbon monomer units (A') and conjugated diolefin monomer units (B"), the A'—B" monomer units may be random, tapered or block and when each of the A' and B" is blocked, the A' block may be the same or different from A" and B" may be the same or different from B';

x' is equal to 0 or 1; and y' is a number from 0 to about 20, with the proviso that the sum of x', y' and z' is greater than or equal to 1.

Blocks A and B may be either homopolymer, random or tapered copolymer blocks as long as each block predominates in at least one class of the monomers characterizing the block. Thus, blocks A may comprise styrene/alpha-methylstyrene copolymer blocks or styrene/butadiene random or tapered copolymer blocks as long as the blocks individually predominate in vinyl aromatics. The A blocks are preferably vinyl aromatic homopolymeric blocks. The term "vinyl aromatic" includes particularly those of the benzene series such as styrene and its analogs and homologs including alpha-methylstyrene and ring alkylated styrenes, particularly ring-methylated styrenes, and other vinyl polycyclic aromatic compounds such as vinyl naphthalene and the like. The preferred vinyl aromatics are styrene and alpha-methylstyrene, and styrene is most preferred.

The block B may comprise homopolymers of conjugated diene monomers, copolymers of two or more conjugated dienes, and copolymers of one of the dienes with a vinyl aromatics as long as the block B predominates in conjugated diene units. The conjugated dienes are preferably ones containing from 4 to 8 carbon atoms. Examples of suitable such conjugated diene monomers include: butadiene, isoprene, 2,3-dimethyl-1,3-butadiene, and piperylene, preferably butadiene and isoprene.

Block copolymers of the present invention comprise two or more vinyl aromatic blocks separated by at least one conjugated diolefin block. These polymers form "networks" of connected vinyl aromatic domains which result in a composition having significant tensile strength.

As used in connection with polymer block composition, "predominantly" means that the specified monomer type shall constitute at least about 85 wt % of the total monomer content of that block.

Anionic polymerization methods that may be used to prepare the base block copolymers of this invention are described in U.S. Pat. Nos. 3,252,905; 3,390,207; 3,598,888; 4,219,627; 3,251,905; 3,265,765; 3,639,521; 4,208,356; 3,231,635; 3,322,856; 4,391,949; and 4,444,953, which are incorporated herein by reference.

The base block copolymers of conjugated dienes and vinyl aromatics which may be utilized in this invention include polybutadiene block containing copolymers which have a polybutadiene 1,2-microstructure content of from about 7% to about 100%, preferably from about 25% to about 65%, more preferably 35% to 55%. These polymers have excellent elasticity due to the microstructure of the polybutadiene blocks.

Block copolymers useful in this invention may contain various ratios of conjugated diene to vinyl aromatic monomer units. The proportion of the vinyl aromatic monomer units in these block copolymers will preferably be between about 1 and about 60 weight percent by weight and more preferably between about 5 and about 40 percent by weight.

The number average molecular weights of the individual blocks may vary within certain limits. In most instances, the vinyl aromatic blocks will have number average molecular weights of about one vinyl aromatic monomer unit per block to a number average molecular weight of about 125,000, and preferably between number average molecular weights of about 1,000 and about 60,000. Conjugated diolefin blocks will preferably have number average molecular weights of from about 10,000 to about 450,000, and preferably from about 10,000 to about 150,000. These molecular weights are most accurately determined by gel permeation chromatography and/or low angle light scattering techniques.

The base block copolymer is preferably, but not necessarily, hydrogenated. Hydrogenation improves thermal, oxidative and U.V. stability of conjugated diolefin containing polymers. Selective hydrogenation refers to hydrogenation of the ethylenic unsaturation while the aromatic saturation remains unhydrogenated, and is preferred.

Hydrogenation of the polymer may be accomplished using any of the methods known in the prior art. The hydrogenation will preferably be selective hydrogenation accomplished using a method such as those taught in U.S. Pat. Nos. 3,494,942; 3,634,549; 3,670,054; 3,700,633 and Re 27,145, which are incorporated herein by reference. Most preferably, selective hydrogenation will be accomplished using one of the processes taught in U.S. Pat. No. 3,700,633. These hydrogenation processes involve the use of a suitable catalyst, particularly a catalyst or catalyst precursor comprising an iron group metal compound. In the methods described in the foregoing patents, the catalyst is prepared by combining an iron group metal, particularly a nickel or cobalt compound with a suitable reducing agent such as an aluminum alkyl. The preferred iron group metal compounds are carboxylates and alkoxides.

The block copolymer is preferably selectively hydrogenated, thereby converting (hydrogenating) at least about 80 percent and most preferably greater than 98 percent of the initial ethylenic unsaturation. Preferably, less than 10 percent and most preferably less than 2 percent of the initial aromatic unsaturation is hydrogenated to obtain the maximum benefits of hydrogenation.

Preferred base block copolymers which have demonstrated utility in the present invention include those with the structure of polystyrene-hydrogenated polybutadiene-polystyrene.

Suitability of polymeric compositions for blow extrusion is often determined by use of a Rheotens Melt Strength Tester. This tester is available from Goettfert Inc. of Rock Hill, S.C. A material's melt strength is determined using an apparatus comprising a plunger that forces a melt of the polymer through an orifice, and two rollers that pull a string of the melt that has been forced through the orifice at a rate that stretches the melt. Force required by the rollers to pull the melt is measured and plotted as a function of elongation ratio. The result of the test is a typically a parabolic curve starting at an elongation ration of one, and zero force and increasing force with elongation ratio until the string of the melt breaks. Although this apparatus determines the ability of the melt to stretch in one direction, whereas the blown extrusion process requires biaxial deformation, this test has been found to be a good predictor of the suitability of polymeric materials in a blown extrusion process.

For elastomeric polymers such as vinyl aromatic/conjugated block copolymer, a high force at break (greater than about 4 centiNewtons) generally results in strong bubbles whereas high elongation at break (generally greater than about 6) is needed in order for a thin film to be made. Generally, the elastomeric polymer of the present invention, at extrusion temperatures, will have a force at break of greater than about 0.5 centiNewtons, and an elongation at break of at least about 5.

The die useful in the present invention must meet certain criteria for a one mil thickness film to be prepared. Because a melt of the block copolymer of the present invention is a viscoelastic material, and therefore has a "memory" of recent flow history. The melt will therefore tend to pull back into its previous form. The die therefore must be angled outward and tapered to a final die gap dimension to minimize abrupt shear deformation in the die. It is believed that memory of this shear deformation caused resistance to abrupt biaxial deformation imposed on the melt by bubble formation and therefore instability in the bubble unless a die such as the die shown in FIG. 1A is utilized.

Figure 1B:
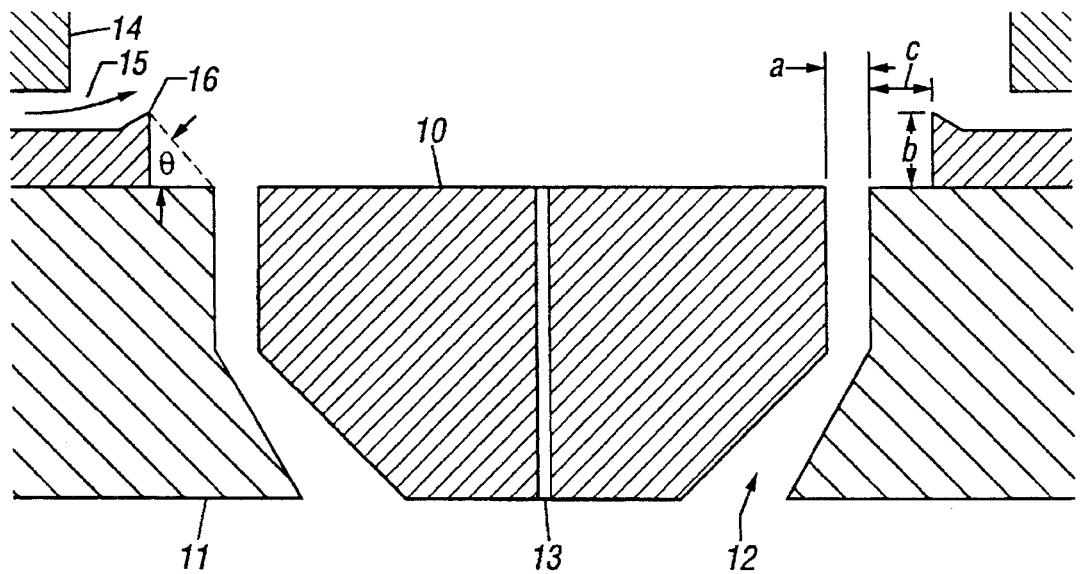
FIG. 1B is a cross sectional view of a die that is not according to the present invention.

Referring now to FIG. 1A and 1B, two dies are shown. The die shown in FIG. 1A can be used in the method of the present invention. The die of FIG. 1B was the standard die provided on the extruder used in the following examples. The standard die did not function effectively, making bubbles that were unstable, uneven, and that had to be made thicker to avoid failure of the bubble. The dies comprise inserts 10 that are supported by the die bodies 11, forming cavities 12 through which the melt flows. The standard die has a gap, dimension a, of 25 mils. The die of the present invention has dimension a of 10 mils in order to blow extrude a film of one to two mils in final thickness. The cavities 12 through which the melt flows are circular, with the cavity of the die of the present invention being linearly tapered and pointed outward. The angle at which the cavity is pointed outward from vertical (or normal to the circular opening of the die), angle $\alpha$, is at least about 10°, and preferably between about ten and about thirty degrees. Having the cavity slanted outward in this fashion results in the melt leaving the gap and progressing more linearly as pressure from within the bubble causes the melt to expand. The cavity is tapered to provide a smooth acceleration of the melt as it progresses out the die. These features have been found to be critical in forming a stable bubble when blow extruding the elastomeric block copolymers of the present invention to thicknesses of between about two and about one mil. The cavity of the standard die has a cylindrical cavity leading to the die, and does not include an angled cavity leading to the gap, nor a tapered cavity leading to the gap.

The angled and tapered cavity of the present invention is preferably at least 1.2 inch long.

Both the standard die and the die of the present invention include an air ring 14 to direct cooling air at the melt of the block copolymer. The air ring 14 provides a circular opening 15 through which a cooling gas such as air travels. The lower boundary of the cooling gas path is defined by a plate 16. The plate 16 in both figures has a height above the gap, dimension b, of about 0.59 inches. The plates 16 differ in their distance from the gap. The elastomeric nature of the block copolymer of the present invention causes a greater expansion above the gap (bubble sagging), and so a greater distance c between the gap and the plate 16 is required in order to prevent the bubble from contacting the plate. Dimension c of FIG. 1A is about 0.94 inches whereas dimension c of the die of FIG 1B is 0.52 inches. Angle $\theta$ of the die useful in the practice of the present invention is therefore about 32° or less. This angle allows for expansion of the bubble without contact with the air ring.

Within the dies, conduits 13 are provided for supplying pressure to within the bubble to maintain the bubble in an expanded state. The pressure is typically applied by supplying air, but any gas could be used.

The dies useful in the practice of the present invention are typically heated dies with at least one thermocouple to provide a control temperature for control of a band heater around the die. The present invention requires stable temperature control to obtain a smooth and uniform film.

To ensure that the film does not exhibit rough surface appearance as a result of the relatively small die gap of the present invention the die temperature is preferably maintained at a higher level than the extruder temperature to reduce the melt viscosity and consequently lower the shear stress in the thinner gap.

Figure 2:
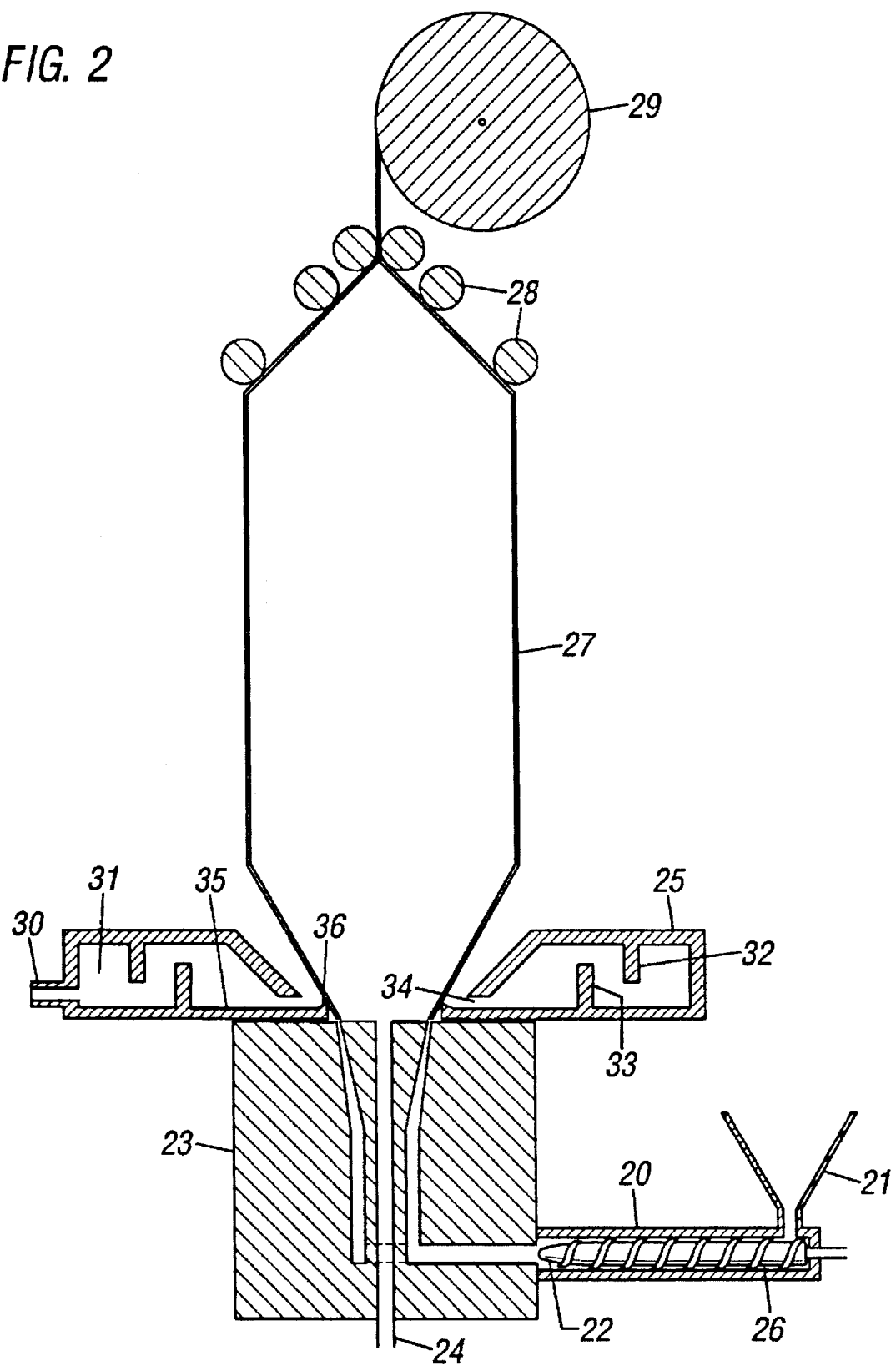
FIG. 2 is a cross sectional and schematic view of an apparatus that can be used in the practice of the present invention.

Referring now to FIG. 2, a schematic cutaway view of an extruder-blower useful in the practice of the present invention is shown. An extruder 20 is fed pellets of block copolymer from a hopper 21 into a low pressure feed section 26 from which an screw compresses and heats pellets of the block copolymer into a high pressure section 22, from which a melt of pressurized polymer exits into a die 23. The die defines a flow path for the block copolymer melt to a circular gap of about 10 mils width. Pressurized air is forced through a channel 24 through the die to maintain a bubble of the block copolymer at the outlet of the gap. Air ring 25 provides a stream of cooling air, and directs the stream of cooling air to the melt of block copolymer exiting the die through the gap. Air inlet 30 is in communication with circular chamber 31. The circular chamber 31 contains vertical baffles 32 and 33 to provide for distribution of the air around the circumference of a cooling air opening 34 that directs cooling air at the bubble of melt. Air ring bottom plate 35 contains a lip 36 to direct the cooling air at the bubble at an appropriate height above the die gap. The melt of block copolymer is cooled to become an elastomeric film tube 27 by the cooling gas stream. The tube of elastomeric film is collapsed by rollers 28 and collected on a spool 29.

The composition of the present invention may, of course, further comprise additives and components known to be useful in elastomeric block copolymer compositions. These other components include non-reactive homopolymers or copolymers of alpha olefins or aromatics. The amount of non-reactive polymer is 100 parts by weight or less and preferably 1 to 50 parts by weight. Fillers, reinforcing materials such as silica, carbon black, glass fibers, organic fibers, calcium carbonate and the like, lubricants, pigments, extender oils, stabilized inhibitors of oxidative, thermal and ultraviolet light degradation, antioxidants, flame retardants, mold release agents and/or crosslinking agents, colorants including dyes and pigments and nucleating agents may also be included.

EXAMPLE

Two compositions of block copolymers of styrene and butadiene were blow extruded to films having thicknesses of less than two mils using a die such as that shown in FIG. 1A having a outer diameter of the gap of 2.04 inches. Composition A included 40 parts by weight of a styrene-hydrogenated butadiene-styrene triblock copolymer having a number average molecular weight of about 52,000 and about 30 percent by weight of styrene and about 60 parts by weight of a styrene-hydrogenated butadiene-styrene triblock copolymer having a number average molecular weight of about 70,000 and about 29 percent by weight of styrene along with components listed below in Table 1. The hydrogenated mid-blocks were greater than 98% hydrogenated.

TABLE I

COMPOSITION A

| parts weight/ 100 parts block copolymer | component/source | |
| --- | --- | --- |
| 45 | PENRECO 4434 Penzoil | paraffinic extending oil |
| 20 | PICOLASTIC D-150 Hercules | low m. wt. polystyrene |
| 1 | IRGANOX 1010 Ciba Geigy | antioxidant |
| 0.5 | DLDTP Cytech Industries | antioxidant |

Composition B was prepared using 150 parts by weight of a compound of a styrene-butadiene-styrene triblock copolymer having a number average molecular weight of about 111,000 and about 30 percent by weight of styrene. This polymer compound is provided with 50 parts weight based on 150 parts by weight of the copolymer compound of plasticizer oil. Table 2 below lists the other components of Composition B.

TABLE 2

COMPOSITION B

| parts weight/ 100 parts block copolymer | component/source | |
| --- | --- | --- |
| 7 | PENRECO 4434 Penzoil | paraffinic extending oil |
| 21 | DP-210 Huntsman Chemical | polystyrene |
| 25 | ELVAX 25D DuPont | polyethyl vinyl acetate |
| 20 | ATTANE 4601 Dow Chemical | linear low density polyethylene |
| 0.4 | IRGANOX 1010 Ciba Geigy | antioxidant |
| 0.6 | DLDTP Cytech Industries | antioxidant |

Blown films were prepared from the two block copolymer compositions using a 1¼" Brabender extruder, along with a die assembly, air ring, and a take-up device, all attached to a frame. For comparison, and to demonstrate that thinner films have acceptable properties, films of composition A were prepared with four mil thickness, and 1.5 mil thickness. The only difference between the apparatuses of the two runs was that a gap of 20 mils was used to prepare the four mil film, whereas a die having a gap of 10 mils was used to prepare the 1.5 mil thickness film. Operating conditions and film properties are summarized in TABLE 3 below.

TABLE 3

| | Thick Film | Thin Film |
| --- | --- | --- |
| OPERATING CONDITIONS | | |
| Melt Temp °C. | 260 | 260 |
| Thickness, mils | 4 | 1.5 |
| Layflat width, in. | 6.5 | 7 |
| RPM | 42 | 40 |
| Feet/Minute | 12 | 19 |
| PROPERTIES | | |
| Tb @ MD, psi | 2189 | 1990 |
| Tb @ TD, psi | 1904 | 1961 |
| Eb @ MD, % | 730.6 | 676.0 |
| Eb @ TD, % | 695.2 | 621.4 |
| 100% Modulus @ MD, psi | 134.7 | 153.4 |
| 100% Modulus @ TD, psi | 153.7 | 154.1 |
| SR60, % | 7.3 | 10.3 |

In Table 3, Tb is tensile stress at break; Eb is ultimate elongation, MD is machine direction, TD is transverse direction, and SR60 is the stress relaxation with 150% strain.

Results of this example demonstrate that films of about one mil thickness can be prepared, and when compared to thicker films, the one mil thickness films do not exhibit significantly impaired physical properties significantly.

We claim:

1. A method to produce a blown film of a vinyl aromatic/conjugated block copolymer comprising the steps of:
   providing an elastomeric composition, the composition comprising a block copolymer of vinyl aromatic and a conjugated block copolymer;
   melting the composition in an extruder;
   passing the melted composition from the extruder through a die, the die being a circular die comprising a circular outlet and a tapered channel in communication with the circular outlet, the circular outlet having an opening width of about $10^{-2}$ inches, the taper being a linear taper of at least a one inch length, the center of the linear taper being angled away from the center of the circular outlet at an angle of at least 10° from a line normal to the circular outlet, and the die having a source of gas pressure inside of the circular outlet; and
   cooling the extruded composition that has been passed through the die with a cooling gas stream.

2. The method of claim 1 wherein the cooling gas stream is directed at the extruded composition from an opening that surrounds the circular outlet, is outside of the circular outlet, and is below about a 35° angle from the circular outlet relative to the plane of the circular outlet.

3. The method of claim 1 wherein the block copolymer is a hydrogenated block copolymer of a vinyl aromatic and conjugated diolefin.

4. The method of claim 3 wherein the hydrogenated block copolymer is a hydrogenated block copolymer of styrene and a diolefin selected from the group consisting of butadiene, isoprene and a combination thereof.

5. The method of claim 1 wherein the center of the linear taper is angled away from the center of the circular outlet at an angle of between 10° and 30° from a line normal to the circular outlet.

* * * * *